Figure 1:
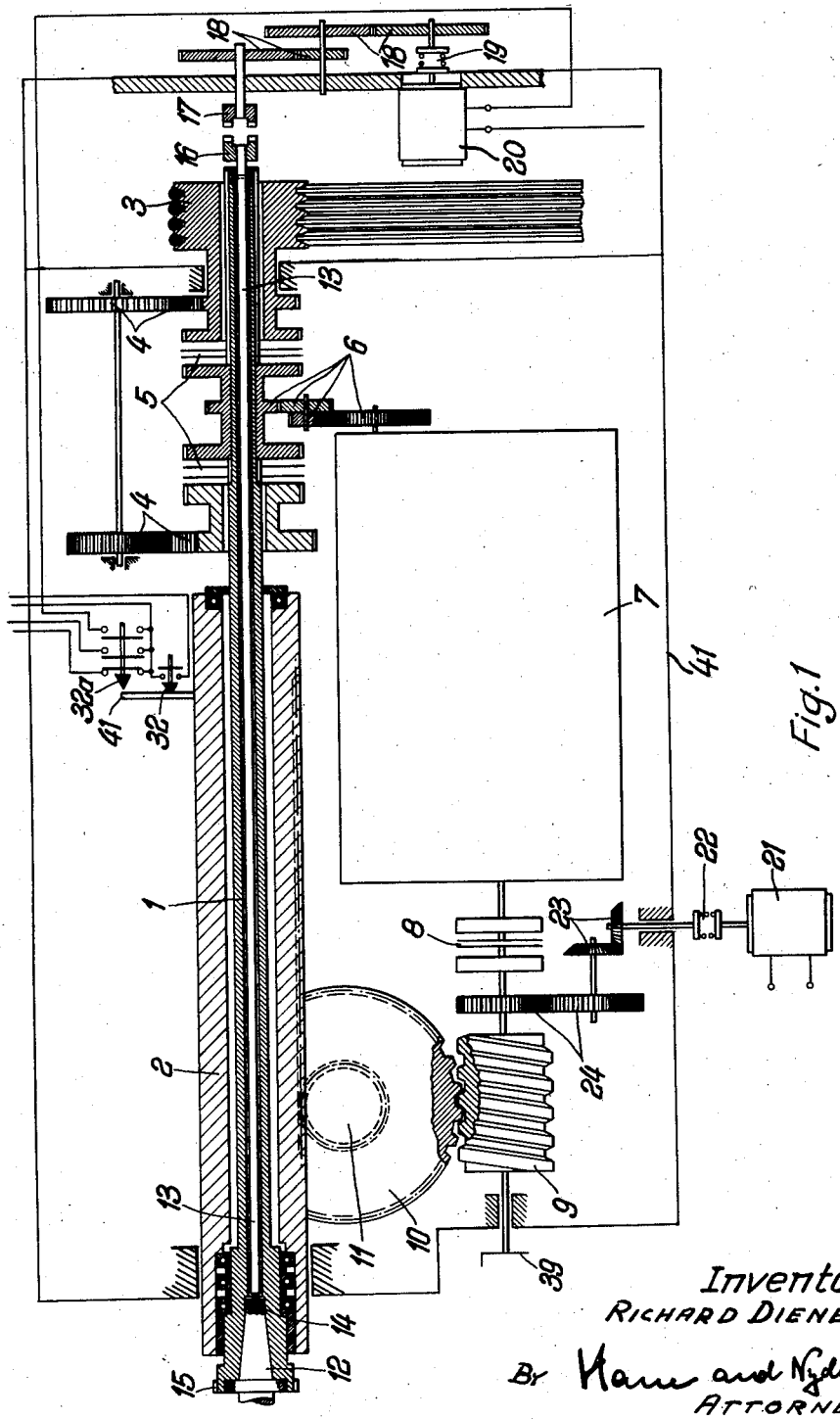

April 28, 1959 R. DIENER 2,883,889
CHUCKING DEVICE FOR MACHINE TOOLS
Filed Jan. 22, 1957 2 Sheets-Sheet 1

Inventor:
RICHARD DIENER
By Kane and Nydick
ATTORNEYS

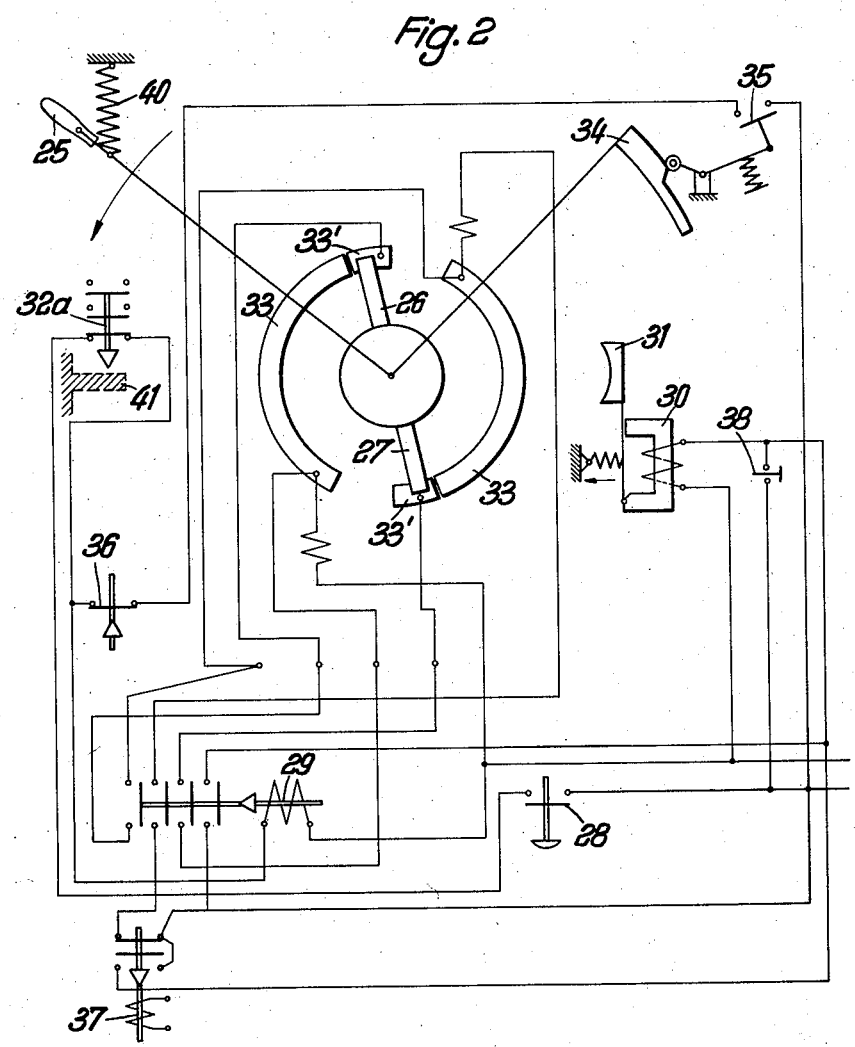

' # United States Patent Office 2,883,889
Patented Apr. 28, 1959

2,883,889

CHUCKING DEVICE FOR MACHINE TOOLS

Richard Diener, Berlin-Hermsdorf, Germany

Application January 22, 1957, Serial No. 635,333

Claims priority, application Germany November 3, 1953

6 Claims. (Cl. 77—5)

The present invention relates to a device for chucking or clamping and releasing respectively a tool by power means.

A preferred, though not exclusive field of application of the invention are tool chucking devices for the tool spindles of drilling, milling and similar machine tools in which the tool is clamped in the conical seat of the tool spindle by means of a thread on a motor driven chucking spindle extending through a hollow tool spindle.

One of the objects of the present invention is to provide a novel and improved chucking device of the general kind above-referred to, which is very simple in construction and highly reliable in operation.

Another object of the invention is to provide a novel and improved chucking device, the design of which is such that the driving connection between the chucking spindle and the chucking motor precludes by simple but sturdy and reliable means a damage or destruction of a tool or a work piece by accidental release of the tool while still within or at the work piece, for instance due to a mistake on the part of the operator.

Still another object of the invention is to provide a novel and improved combination of the tool chucking device with an axial rapid advance device for the tool spindle by means of which the tool spindle is automatically and rapidly drawn into the chucking position in the spindle box and can be equally rapidly advanced toward the work piece after the tool has been exchanged, by a stepless or gradual controllable motion.

In a tool chucking device according to invention, the two coupling members of a coupling of conventional design are provided at the chucking gearing and the axially movable tool spindle respectively. The two coupling members of the coupling members of the coupling can engage each other only after and when the tool spindle has been fully withdrawn into the spindle box for effecting chucking or releasing of a tool depending upon the rotational direction of the chucking motor. Consequently, the chucking or releasing of a tool is possible only when the tool spindle is fully withdrawn into the spindle box and the tool is completely withdrawn from a work piece. As a result, there is no longer any danger of a damage or destruction of the tool or the work piece by a faulty operation.

The device according to the invention further comprises circuit control switches in the spindle box which are actuated by the axially movable tool spindle in a manner such that in the limit position of the tool spindle in which the same is completely withdrawn into the tool box the rotation of the tool spindle is stopped and the chucking motor and a device for displacing of the spindle box or the table of the machine are readied for operation.

In the tool chucking device according to the present invention, the axial displacement of the tool spindle or a spindle sleeve associated therewith is utilized in combination with a rapid advance arrangement to assure a fault-free and reliable operation of the chucking device. In order to withdraw the tool spindle into the spindle box as required for the change of a tool and to advance a tool to the workpiece after a change of the tool in the shortest possible time, the tool spindle is equipped with a motor driven rapid advance arrangement. The rapid advance mechanism is arranged so that by operation of a switch the tool spindle is automatically pulled into the chucking position in the spindle box by a "constant rapid motion." After the change of the tool, the tool spindle and with it the tool thereon can be moved from the chucking position into any selected position of advance relative to a work piece by a "gradual or stepless controllable rapid motion."

The use of a "constant rapid motion" affords the advantage that the tool spindle can be rapidly moved into the chucking position thereby keeping at a minimum the required time for changing a tool. The "gradual controllable rapid motion" affords the advantage that a tool chucked in the tool spindle can be moved toward a work piece with a controllable and variable rate of speed.

The present application is a continuation-in-part of pending application Ser. No. 442,035, filed July 7, 1954.

In the accompanying drawing, there is shown by way of illustration and not by way of limitation an embodiment of the invention which is especially suitable for use in connection with a drilling or milling machine, but may also be utilized for all machine tools in which a tool has to be seated in the seat of a tool spindle.

In the drawing:

Fig. 1 is a fragmentary, partly sectional, view of a tool spindle including driving and transport means therefor and equipped with a tool chucking safety device according to the invention, and Fig. 2 is a circuit diagram for the control of the arrangement of Fig. 1.

Referring first to Fig. 1 in detail, the components shown in this figure should be visualized as being components of a machine tool of generally conventional design. Accordingly, only those components are shown that are essential for the understanding of the invention.

The assembly of the figure comprises a tool spindle 1 which is rotatable, but not axially displaceable. The spindle is mounted within a spindle sleeve 2 which is in turn is not rotatable, but axially displaceable within and relative to a spindle box 41. Accordingly, an axial displacement of sleeve 2 causes a corresponding axial displacement of spindle 1 relative to the spindle box. The tool spindle is driven by any suitable means shown by way of example as a pulley 3 for a belt and a gear train 4 which can be connected and disconnected by suitable couplings 5. The rotation of the tool spindle is transmitted through a gear train 6 to a gearing 7 indicated by a block. Gearing 7 serves to displace spindles 2 and 1 and to this end, the rate of advance as set in gearing 7 is transmitted through a clutch 8, a worm drive 9, 10 to a pinion 11 which engages rack teeth on spindle sleeve 2 whereby a rotation of worm gear 10 is converted into an axial displacement of sleeve 2 and with it, of tool spindle 1. Coupling 8 which may be an electrically operated coupling, is normally open, but is automatically closed when sleeve 2 and spindle 1 are advanced by actuation of gearing 7. Inasmuch as the design of gearing 7 and coupling 8 are not essential for the understanding of the invention, they are not illustrated or explained in detail.

The end of spindle 1 protruding from the spindle box is formed with a conical chuck bore for receiving the matching conical shaft end 12 of a tool or a tool carrier. The tool spindle is hollow and houses a rotatable chucking spindle 13 which is engageable with tool shaft 12 by means of a threaded stub 14 fitting a correspondingly threaded bore in shaft 12 whereby the tool can be securely retained in the chuck seat of the tool spindle. The tool spindle has one or several teeth 15, two diametrically opposite teeth being shown, which engage corresponding notches in a collar on tool shaft 12 to prevent a rotation of the tool within its seat in the tool spindle.

The opposite end of chucking spindle 13 is extended beyond tool spindle 1 and mounts within the spindle box a coupling member 16 of a coupling of conventional design such as a gearing coupling. The other coupling member 17 of this coupling is seated upon the output shaft of a gear train 18 which is driven through a slipping clutch 19 by a reversible chucking motor 20. Coupling member 17 is stationarily mounted within the spindle box and in a position such that the coupling members 16 and 17 engage each other only when the tool spindle 1 and with it spindle 13 is in its innermost position within the spindle box. As is now evident, the rotation of chucking motor 20 is transmitted through the slipping clutch 19 and the gear train 18 upon the chucking spindle 13 only if and when coupling 16, 17 is closed or, in other words, chucking spindle 13 can be rotated only when the tool spindle 1 is in its innermost position in the spindle box.

In order to move the tool spindle 1 rapidly and with a "rapid constant advance motion" into the chucking position and to move it out of this position, that is, into the opposite direction, with a variable rate of speed, that is, with a "gradually or steplessly controllable advance motion" into any other selected position relative to the spindle box and a work piece, a pole and direction reversible motor 21 is provided. This motor drives the worm gear 9 through a slipping coupling 22, a pair of bevel gears 23 and a gear train 24. As already mentioned worm gear 9 engages spindle sleeve 2. Accordingly, this sleeve is displaced into or out of the spindle box depending upon the rotational direction of motor 21, coupling 8 being normally open. The r.p.m. of motor 21 and the ratio of transmission of gearings 23 and 24 are so selected that sleeve 2 and with it tool spindle 1 and coupling member 16 can be moved into the chucking position by rapid motion in the shortest possible period of time.

To control the rate of motion and the direction of displacement of tool spindle 1 as previously described, a circuit control system is provided for motor 21 in accordance with the circuit diagram of Fig. 2.

According to this figure, the brushes 26 and 27 of motor 21 can be rotationally adjusted in relation to a pair of short contact segments 33' and a pair of long contact segments 33 by means of a lever 25 thereby correspondingly changing the rotational direction and r.p.m. of the motor. A loaded spring 40 biases lever 25 into the illustrated position in which brushes 26 and 27 engage contact segments 33'. This position of the brushes represents the "rapid constant advance" of the tool spindle. When it is desired to move the tool spindle into the spindle box with this rapid constant motion, a push button 28 is actuated whereby an energizing circuit for a relay 29 is closed. The relay closes its normally open four pairs of contacts. As a result, a solenoid 30 is energized and an energizing circuit for motor 21 is also closed. Solenoid 30 releases a brake 31 which normally brakes the tool spindle advance motion and the motor 21 due to the engagement of its brushes 26 and 27 with contact segments 33' is readied for rotation in the direction in which the tool spindle 1 is moved toward the spindle box and the chucking position. Spindle sleeve 2 supports a nose or dog 41 which just before the tool spindle reaches the chucking position opens a switch 32 which interrupts the rotation of the tool spindle by energizing suitable conventional stop circuit means. When the tool spindle reaches the chucking position, nose 41 actuates a second switch 32a disposed somewhat closer to the end position of the tool spindle. Switch 32a at its normally closed contacts de-energizes relay 29 whereby the axial movement of sleeve 2 is immediately stopped by release of brake 31 due to the de-energization of relay 29. Simultaneously, the switch 32a through its normally open contacts closes an energizing circuit for chucking motor 20 and also for a conventional mechanism for displacement of the spindle box or the table of the machine tool which is now ready for operation.

When it is now desired to move the tool spindle automatically into the opposite direction and into a selected position relative to the work piece at the "gradually controllable variable speed advance motion," lever 25 is actuated. By rotation of the lever in the direction of the arrow and against the action of spring 40, brushes 26 and 27 of motor 21 are moved into engagement with the long contact segments 33. Simultaneously, a control segment 34 associated with lever 25 and controlled by the position thereof, closes a switch 35 which in turn closes a new energizing circuit for relay 29. As previously mentioned, energization of relay 29 starts motor 21 and releases brake 31. Motor 21 now rotates in the direction in which spindle sleeve 2 and with it tool spindle 1 are moved out of the spindle box. The rate of speed of motor 21 and with it the speed with which tool spindle 1 is withdrawn from the spindle box can be gradually regulated by adjusting lever 25 on segments 33 as is well known to persons skilled in the art, the speed of rotation of the motor increasing by turning lever 25 in the direction of the arrow. This affords the advantage that the tool can be caused to approach the work piece at a speed which is gradually or steplessly controllable within the range of the maximum r.p.m. of the motor.

When the selected position of the tool is reached, lever 25 is released and returns into the illustrated position by the action of spring 40. Due to the return of the lever into the illustrated position, control segment 34 reopens switch 35 thereby de-energizing relay 29 and with it magnet 30 so that brake 31 arrests the further advance of the tool spindle toward the work piece.

While the tool spindle is moving either toward the chucking position or toward the work piece, the gearings 22, 23, 24 and 9, 10, 11 are disengaged from the advance gearing 7 by the normally open coupling 8 as already mentioned. A switch 36 (see Fig. 2) serves as a limit switch which disconnects the advance of the tool spindle when the same has reached its permissible maximum position toward the work piece.

A relay 37 controls in a conventional manner the advance of the tool spindle by means of an automatic switch. The relay, in turn, is controlled by the setting of an adjustable pointer coacting with a depth adjustment scale. The final fine adjustment of the advance of the tool spindle can be effected by means of a hand wheel 39 which is coupled with a switch 38 which when closed, closes an energizing circuit for solenoid 30 to lift brake 31.

To further explain the function of the safety device according to the invention, a complete operational cycle including the change of a tool will now be described.

Let it be assumed that an operation involving an axial advance of the tool spindle toward the workpiece has been completed and that the advance of the tool spindle has been automatically stopped by actuation of relay 37 controlled by the depth setting device. To return the tool spindle 1 into its chucking position in the spindle box by the rapid constant advance motion push button switch 28 is actuated.

When the tool spindle reaches the chucking position, the rotation of the tool spindle is stopped, coupling members 16 and 17 are in engagement and the chucking motor 20 as well as a mechanism for displacement of the spindle box or the table of the machine tool are readied for operation. As required, the tool can now be exchanged or the spindle box and the table respectively may be set for another operational position.

To exchange a tool, chucking motor 20 is started by means of a switch in the appropriate rotational direction. The motor now rotates the chucking spindle 13 through gearing 19, 18 and coupling 16, 17 in the direction in which the threaded stub 14 is screwed out of shaft 12 of the tool and the tool is forced out of the conical chuck of tool spindle 1. The new tool is then inserted in the chuck in a position such that its teeth 15 engage the slots in the collar of the tool shaft. By operating another appropriate switch chucking motor 20 and with it chucking spindle 13 are now rotated in the opposite direction in which threaded stub 14 is screwed into the shaft of the tool whereby the latter is pulled into the chuck on tool spindle 1. As soon as the tool shaft is seated tightly in the chuck so that the chucking spindle 13 can no longer be readily rotated by motor 20, the slipping clutch 19 begins to slip. This has the advantage that the chucking force with which the tool is pulled into the chuck on the tool spindle is an approximately uniform one thereby protecting the chucking motor 20 from overload. After the tool has been exchanged or the spindle box and the table respectively are set for another operational position, the tool is moved with the gradual speed controllable advance motion toward the work piece by actuating lever 25 as previously described.

The fine adjustment is effected manually by means of hand wheel 39 as also already described.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for automatically chucking a tool in and releasing from the tool spindle of a machine tool of the kind wherein for automatic chucking of the tool in and releasing from the chuck of the tool spindle, a chucking spindle is rotatable within a hollow rotatable tool spindle which is axially movable jointly with the chucking spindle into and out of a spindle box, and drive means for moving the tool spindle and the chucking spindle into and out of the spindle box, said device comprising a chucking motor for rotating said chucking spindle, a coupling for drivingly connecting the chucking spindle with the chucking motor, said coupling having two axially aligned coupling members, one of said coupling members being fixedly secured to said chucking spindle for joint axial movement with the chucking spindle and the tool, the other coupling member being stationarily though rotatably mounted in the spindle box and drivingly connected with said chucking motor, the position of said stationary coupling member in the spindle box being such that it is engageable by the coupling member on the chucking spindle in the innermost axial position only of said spindle in the spindle box, energizing circuit means for said chucking motor including a normally open motor control switch means, and actuating means for said switch means controlled by the axial displacement of the tool spindle and the chucking spindle toward the spindle box, said actuating means closing said switch means in said innermost position of the tool spindle and the chucking spindle whereby a rotation of the chucking spindle for chucking and releasing respectively of the tool is precluded prior to the withdrawal of the tool spindle from a work piece.

2. A device according to claim 1, wherein the driving connection between the stationary coupling member and the chucking motor includes a slipping coupling, the said coupling slipping in response to a predetermined torque load whereby the rotational chucking force applied by the chucking spindle is limited to a constant maximum force.

3. A device according to claim 1, and further comprising a speed controllable and reversible electric motor for axially displacing the tool spindle, energizing circuit means for energizing said motor, and circuit control means for selectively connecting the tool spindle motor to the tool spindle for axially displacing the same and with it, the chucking spindle toward the chucking and release position in the spindle box at a uniform rate of speed and in the opopsite direction toward a working position at a gradually controllable variable rate of speed, said circuit control means comprising two pairs of contact elements, one pair for connecting said tool spindle motor for said uniform rate of speed and the other for said variable rate of speed, and said tool spindle comprising brushes selectively movable into engagement with either said of contact elements.

4. A device according to claim 3, wherein spring means coact with said brushes for urging the latter into engagement with the pair of contact elements for the uniform rate of speed.

5. A device according to claim 1 and further comprising electrically operated brake means for braking the axial advance of the tool spindle, and energizing circuit means for said brake means including a control switch means, said control switch means being actuated by engagement with the tool spindle for energizing said brake circuit means for releasing the brake means upon the tool spindle reaching a predetermined axial position.

6. A device according to claim 5 and further comprising a sleeve axially displaceable by said drive means for moving said tool spindle, said tool spindle being rotatable in said sleeve and axially displaceable in unison therewith, and said sleeve having thereon an actuating member engageable with said switch means for the brake circuit means.

References Cited in the file of this patent

UNITED STATES PATENTS

| | | |
|---|---|---|
| 2,667,819 | De Vlieg | Feb. 2, 1954 |
| 2,685,823 | Kaiser | Aug. 10, 1954 |
| 2,713,811 | Stephan | July 26, 1955 |